(«12») United States Patent
Stevens et al.

(10) Patent No.: US 11,852,168 B2
(45) Date of Patent: Dec. 26, 2023

(54) FAN HUB ISOLATOR

(71) Applicants: Robert Bosch GmbH, Stuttgart (DE); William M. Stevens, Maynard, MA (US); Alexander Czulak, Watertown, MA (US)

(72) Inventors: William M. Stevens, Maynard, MA (US); Alexander Czulak, Watertown, MA (US)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 17/616,106

(22) PCT Filed: May 14, 2020

(86) PCT No.: PCT/US2020/032806
§ 371 (c)(1),
(2) Date: Dec. 2, 2021

(87) PCT Pub. No.: WO2020/251720
PCT Pub. Date: Dec. 17, 2020

(65) Prior Publication Data
US 2022/0299045 A1 Sep. 22, 2022

Related U.S. Application Data

(60) Provisional application No. 62/860,499, filed on Jun. 12, 2019.

(51) Int. Cl.
*F04D 29/66* (2006.01)
*F04D 19/00* (2006.01)
(Continued)

(52) U.S. Cl.
CPC ......... *F04D 29/668* (2013.01); *F04D 19/002* (2013.01); *F04D 25/06* (2013.01); *F04D 29/329* (2013.01)

(58) Field of Classification Search
None
See application file for complete search history.

(56) References Cited

U.S. PATENT DOCUMENTS 7,585,159 B2 * 9/2009 Caplan ................ F04D 29/668
416/169 A
9,476,426 B2 * 10/2016 Nicgorski ............ F04D 19/002
(Continued)

FOREIGN PATENT DOCUMENTS

CN 102086888 A 6/2011
CN 205714976 U 11/2016
(Continued)

OTHER PUBLICATIONS

International Search Report and Written Opinion for Application No. PCT/US2020/032806 dated Aug. 13, 2020 (14 pages).
(Continued)

*Primary Examiner* — Juan G Flores
(74) *Attorney, Agent, or Firm* — Michael Best & Friedrich LLP

(57) ABSTRACT

An axial fan assembly includes blades rotatable about a central axis, a hub connecting the blades at radially-inner ends thereof, and a motor connected to a first portion of the hub. A second portion of the hub supporting the plurality of blades is isolated from the first portion of the hub by a plurality of slots. A plurality of ribs interconnect the first and second hub portions, the ribs defining unsupported regions along bordering ones of the slots. Inner and outer attachment portions of the ribs extend radially inward and radially outward, respectively, from the unsupported regions to attach with the first and second hub portions. As viewed along the central axis, a first thickness defined at each of the unsupported rib portions is less than a second thickness defined at one of the inner and outer attachment portions.

20 Claims, 8 Drawing Sheets

(51) Int. Cl.
  *F04D 25/06* (2006.01)
  *F04D 29/32* (2006.01)

(56) References Cited

U.S. PATENT DOCUMENTS

| | | | | |
|---|---|---|---|---|
| 2004/0223845 A1 * | 11/2004 | Caplan | ............... | F04D 25/082 |
| | | | | 415/173.1 |
| 2013/0216376 A1 * | 8/2013 | Nicgorski | ............ | F04D 29/329 |
| | | | | 415/220 |
| 2015/0308457 A1 | 10/2015 | Gabbin et al. | | |

FOREIGN PATENT DOCUMENTS

| KR | 20040095368 A | * | 11/2004 |
|---|---|---|---|
| KR | 20040095368 A | | 11/2004 |

OTHER PUBLICATIONS

Chinese Patent Office Action for Application No. 202080050795.0 dated Jul. 29, 2023 (9 pages including English translation).

* cited by examiner

FAN HUB ISOLATOR

RELATED APPLICATIONS

This application claims the benefit of U.S. Provisional Patent Application No. 62/860,499 filed Jun. 12, 2019, the entire content of which is hereby incorporated by reference herein.

BACKGROUND

This invention relates generally to motor-driven fans, which may be axial-flow fans used as automotive engine cooling fans, among other things. The invention further relates to the reduction of noise originating from the motor of electronically-controlled engine cooling fans.

Automotive fans are used in vehicles to move air through a set of heat exchangers which can include a radiator to cool an internal combustion engine, an air-conditioner condenser, and/or additional heat exchangers. Typically, such a fan is powered by an electric motor. Although prior efforts have resulted in the development of isolated-hub fans that provide significant noise reduction, there remains a need for further improvement of structural robustness and manufacturability in isolated-hub fans.

An automotive engine-cooling fan assembly can include a motor having a driveshaft defining a central axis, and a fan driven by the motor. The fan includes an inner hub portion, which attaches to the motor's driveshaft or drive-hub, and an outer hub portion, which is attached to a plurality of radially extending blades. Inner and outer portions of the hub are connected with a plurality of unsupported connecting ribs. These ribs also serve to isolate the fan acoustically from motor vibrations. An example of this can be seen from U.S. Pat. No. 7,585,159 to Caplan et al., the entire contents of which are incorporated by reference herein.

It is desirable when designing an engine cooling fan assembly to minimize noise and vibration. A rigid connection between the motor rotor and the fan hub allows for vibration energy caused by motor cogging forces to pass from the motor to the fan. This can excite resonant modes in the fan structure. Once in resonance, the fan surfaces radiate those vibrations, resulting in airborne tonal noise. As disclosed by Caplan et al., the connection between the motor and the fan can be decoupled in order to reduce the excitation of torsional modes. A design with such decoupling, however, must maintain air moving performance, structural integrity, and motor-cooling air flow.

SUMMARY

It is desirable when designing an automotive engine-cooling fan assembly to minimize noise and vibration. Some engine-cooling fan assemblies may suffer from higher than desirable levels of noise, vibration, and harshness ("NVH") caused by, for example, motor cogging torque, axial cogging forces, torque ripple, and axial ripple forces which can excite resonant modes in the fan structure. Automotive engine-cooling fan assemblies according to the present disclosure decrease the excitation of torsional and axial modes of vibration of the fan while maintaining the air-moving performance, structural integrity, motor-cooling airflow, and low cost of the fan.

In one aspect, the invention provides an axial fan assembly including a plurality of blades rotatable about a central axis, a hub connecting the plurality of blades at radially-inner ends thereof, and a motor connected to a first portion of the hub. A second portion of the hub supporting the plurality of blades is isolated from the first portion of the hub by a plurality of slots. A plurality of ribs interconnect the first and second hub portions, the plurality of ribs defining unsupported regions along bordering ones of the plurality of slots. Inner and outer attachment portions of the plurality of ribs extend radially inward and radially outward, respectively, from the unsupported regions to attach with the first and second hub portions. As viewed along the central axis, a first thickness defined at each of the unsupported rib portions is less than a second thickness defined at one of the inner and outer attachment portions such that a ratio of the second thickness to the first thickness is 1.5:1 to 2.5:1.

In another aspect, the invention provides an axial fan assembly including a plurality of blades rotatable about a central axis, a hub connecting the plurality of blades at radially-inner ends thereof, and a motor connected to a first portion of the hub. A second portion of the hub supporting the plurality of blades is isolated from the first portion of the hub by a plurality of slots. A plurality of ribs interconnect the first and second hub portions, the plurality of ribs defining unsupported regions along bordering ones of the plurality of slots. A pair of attachment portions are defined at opposite radial ends of the unsupported region, each of the pair of attachment portions having curved shapes on each side defined by curved profiles of an adjacent pair of slots of the plurality of slots.

In yet another aspect, the invention provides an axial fan assembly including a plurality of blades rotatable about a central axis, a hub connecting the plurality of blades at radially-inner ends thereof, and a motor connected to a first portion of the hub at a plurality of mounting bosses. A second portion of the hub supporting the plurality of blades is isolated from the first portion of the hub by a plurality of slots. A plurality of ribs interconnect the first and second hub portions, the plurality of ribs defining unsupported regions along bordering ones of the plurality of slots. The plurality of slots define a circumferentially-repeating pattern in which radial slot portions adjacent two adjacent ones of the plurality of ribs are interconnected by a circumferential slot portion at a first radial distance from the central axis. The circumferentially-repeating pattern is deviated at the locations of the plurality of mounting bosses, such that a circumferential slot portion interconnecting two adjacent radial slot portions along each one of the plurality of mounting bosses extends beyond the first radial distance to deviate around the mounting boss.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
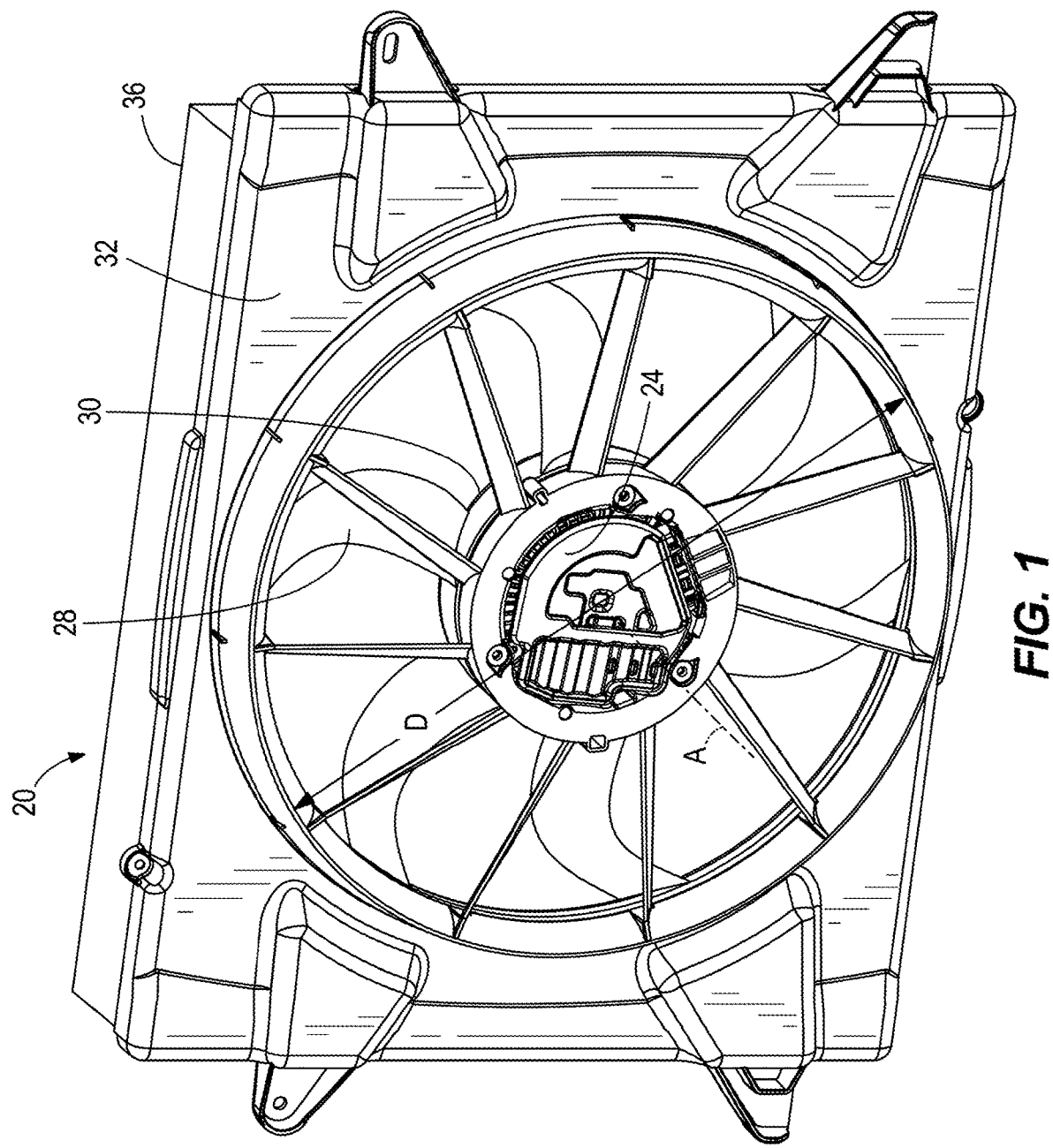
FIG. 1 is a perspective view of an engine cooling fan.
Figure 2:
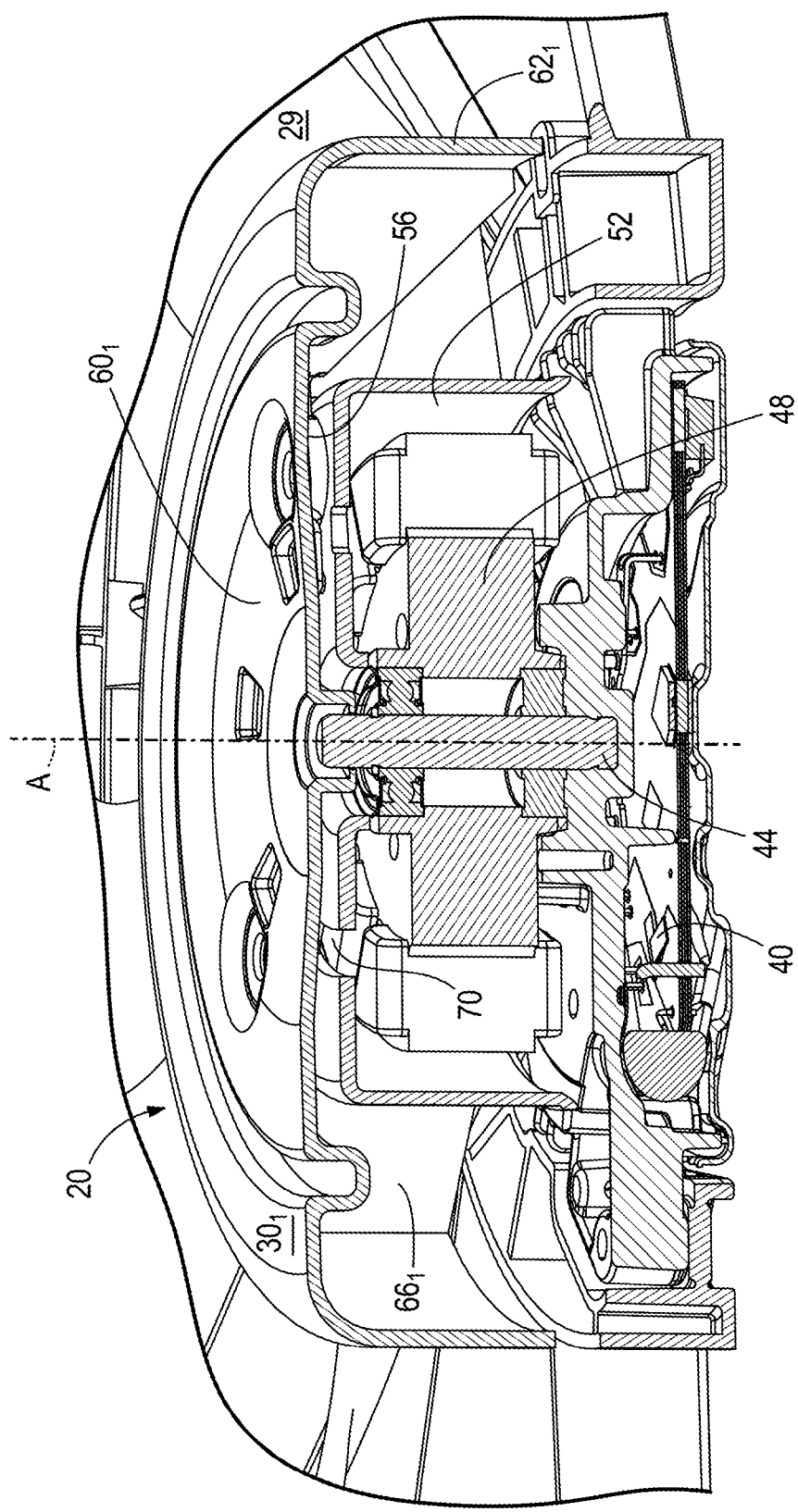
FIG. 2 is a cross-section of the engine cooling fan of FIG. 1, taken through a plane containing a central rotational axis of the fan.

As shown in FIG. 1, an engine cooling fan assembly 20 includes an electric motor 24 that drives a fan 28 having a plurality of blades 29 projecting radially from a hub 30. The outer tips of the blades can be free or connected with a band for cooperative support therebetween. The motor 24 and the fan 28 rotate about a central axis A. The motor 24 can be an electronically-commutated (EC) motor. The motor 24 and the fan 28 mount to a shroud 32 that is configured to ventilate one or more heat exchangers 36, e.g., for an internal combustion or electric vehicle's drive and HVAC systems. With reference to FIG. 2, the EC motor 24 includes an electronic power module 40, a shaft 44, a stator 48, and a rotor 52. The motor rotor 52 is coupled to the fan hub $30_1$ via mounting bosses 56 (e.g., screw bosses), allowing torque to be transmitted from the motor 24 to the fan 28. As shown, the rotor 52 can have an annular shape at least partially encompassing the stator 48.

The hub $30_1$ shown in FIG. 2 is of a conventional construction. The hub $30_1$ mounts to the motor rotor 52 and attaches the fan blades 29 at their respective radially inner ends. The hub $30_1$ can include both a face portion or inner hub portion $60_1$ that extends radially outwardly from the shaft 44, and a cylindrical portion or outer hub portion $62_1$, to which the fan blades 29 are attached. To conserve axial space, the motor 24 can be positioned on a concave side of the hub $30_1$, in other words, at least partially or fully within a concavity formed by the inner and outer portions $60_1$, $62_1$ of the hub $30_1$. Radial ribs $66_1$ are incorporated within the hub $30_1$ to stiffen the fan structure against centrifugal forces. The ribs $66_1$ also help cool the motor 24, acting like a centrifugal fan to pull air through the motor's vent holes 70.

Figure 2A:
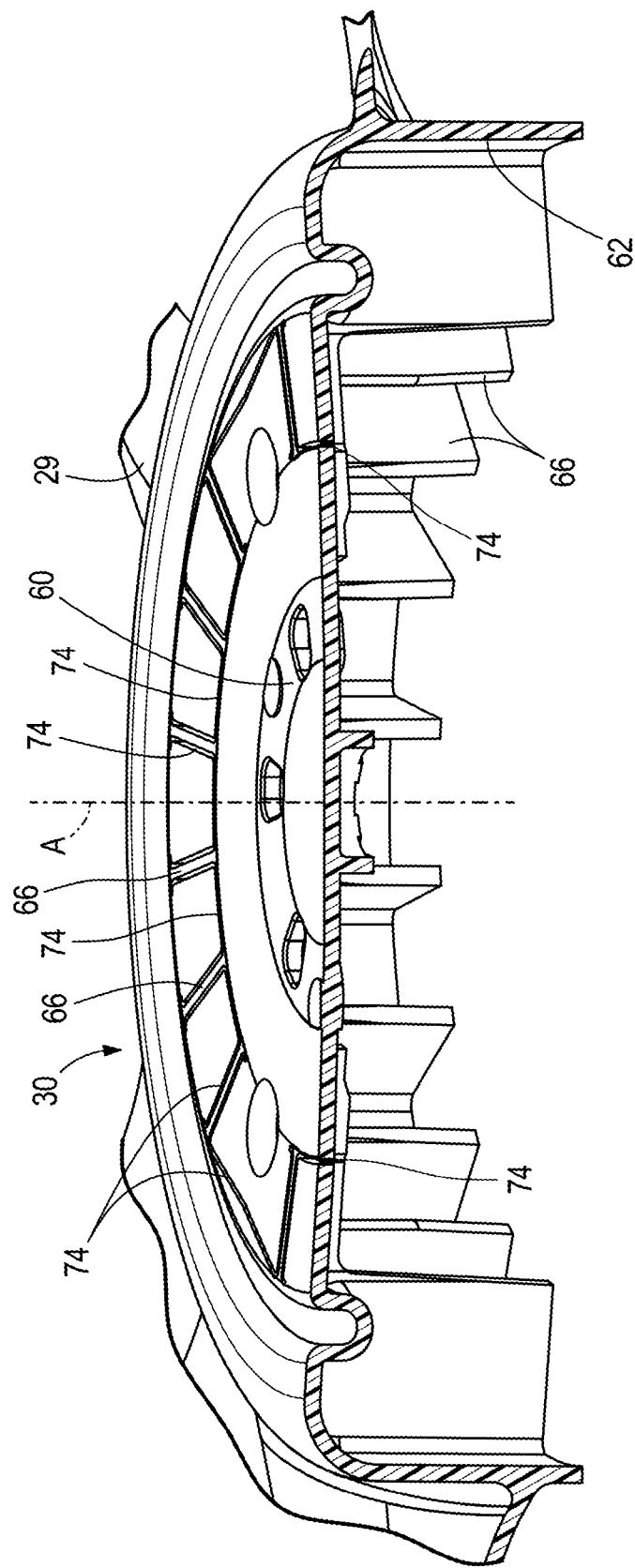
FIG. 2A is a cross-section of a fan hub according to one embodiment of the present disclosure for an engine cooling fan like that of FIGS. 1 and 2.

The hub 30 according to a first embodiment of the present disclosure is shown in FIG. 2A. Except for the distinguishing features noted specifically below, the hub 30 is similar to the above described hub $30_1$, and those skilled in the art will appreciate that the hub 30 of FIG. 2A may be substituted for the hub $30_1$ in the construction of a novel engine cooling fan assembly, including the motor 24 and other parts mentioned above.

Figure 3:
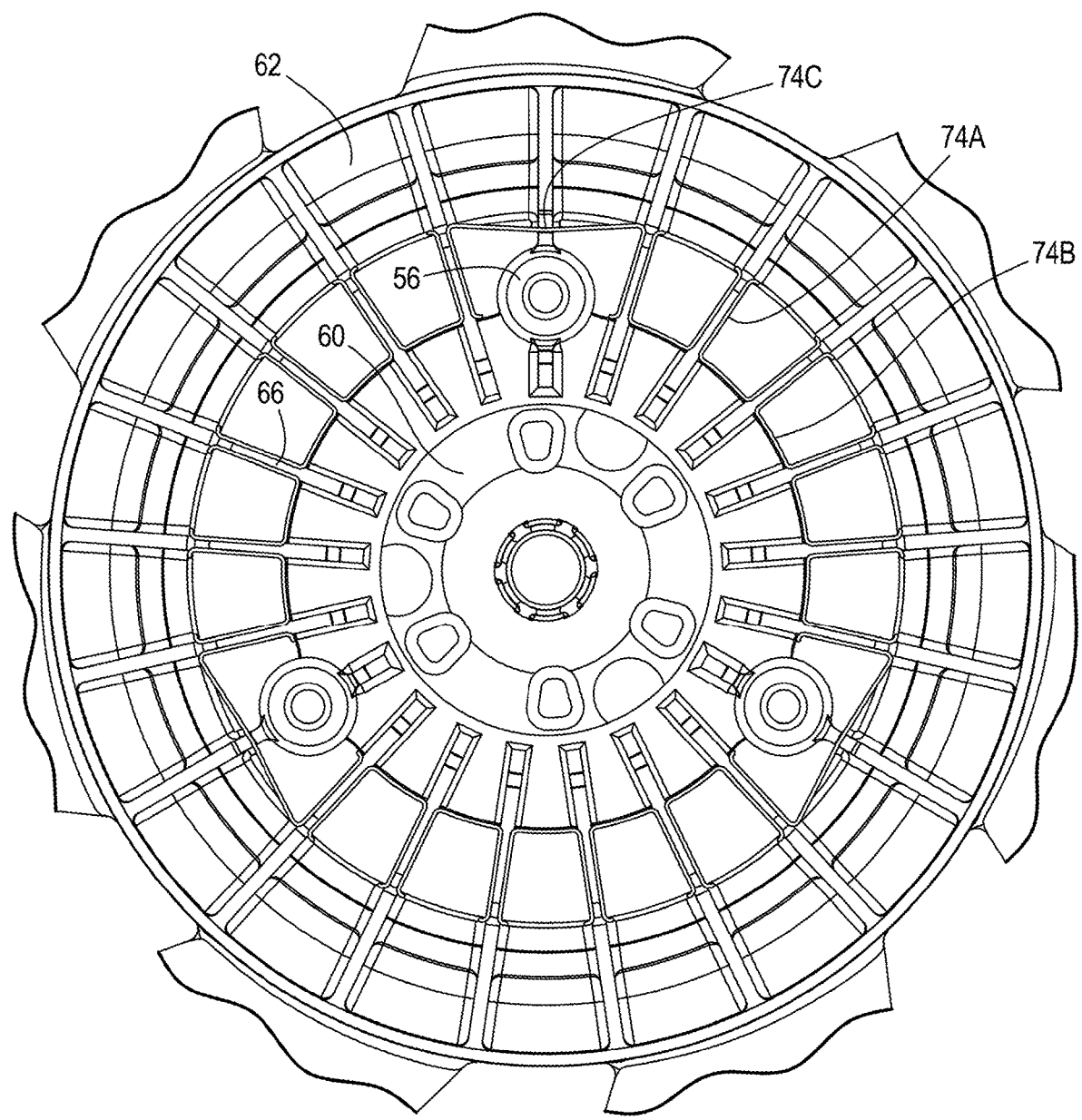
FIG. 3 is a rear or interior view of the hub of FIG. 2A.

Further features of the hub 30 are described with reference to FIGS. 3 to 5, all of which view at least partially along the central axis A into the concavity, thus illustrating an interior or rear side of the hub 30. As discussed above, the inner hub portion 60 is coupled to the rotor 52 of the motor 24, and the outer hub portion 62 attaches the fan blades 29. The outer hub portion 62 is coupled to the inner hub portion 60 by the ribs 66. A radially-extending portion of each rib 66 is planar and defines a plane including the central axis A. Slots 74 extend adjacent the ribs 66 and include radially-extending slot portions 74A extending along either side of the ribs 66 as well as circumferentially-extending slot portions 74B extending between each adjacent pair of ribs 66. Thus, the hub 30 provides torsional decoupling through the provision of the vibration isolating ribs 66. The circumferential portions 74B of the slots 74 define the radial boundary between the inner and outer hub portions 60, 62. The circumferential portions 74B of the slots 74 extend circumferentially the entire distance between the radially extending slot 74A on one side of one rib 66 and the radially extending slot 74A on the adjacent side of the adjacent rib 66.

The slots 74 create unsupported regions 66A in the ribs 66. In these unsupported regions 66A, the ribs 66 are the only structure interconnecting the inner and outer hub portions 60, 62. During operation of the fan 28, the unsupported regions 66A of the ribs 66 can deflect. This deflection decouples the outer portion 62 of the fan hub 30 from the inner portion 60 in the tangential direction. This torsional decoupling reduces acoustic noise radiated from the fan 28 due to forces originating in the motor 24. The ribs 66, particularly the unsupported portions 66A, define a length L measured radially with respect to the axis A, and a thickness T1 measured perpendicular to the length L as viewed along the axis A. The thickness T1 can generally be considered circumferential thickness as it is measured tangential to an arc centered on the axis A in the axial view. The length L can be at least 4 times or at least 5 times the thickness T1. In some aspects, the length L is not more than 10 times the thickness T1, or not more than 12 times the thickness T1.

The ribs 66 are spaced from the motor 24 to provide cooling airflow through the motor 24. The ribs 66 also function as centrifugal fan blades during rotation to generate an airflow through the motor 24. The width W (FIG. 4) of the slots 74 is sufficiently large to assure that the ribs 66 are separated from adjacent hub portions, and yet small enough so that the opening through which air can flow is relatively small. As such, the motor-cooling airflow is minimally affected by the slots 74. The ribs 66 can axially extend to within running clearance of the motor 24 (i.e., defining an engineering running clearance fit therebetween).

Additional design elements alleviate the potential for undesirable and/or unpredictable stress concentrations at intersections between unsupported portions 66A of the ribs 66 and the stiffer structure at either radial end. The ribs 66 are thickened at portions 66B where they attach to the face portion or inner hub portion 60 of the hub 30 just inboard and outboard of the regions 66A in which they are slotted and thereby unsupported. In other words, the unsupported portions 66A of the ribs 66 define a first thickness T1 (measured circumferentially), while attachment portions 66B of the ribs 66 directly adjacent the unsupported portions define a second thickness T2 (measured circumferentially) that exceeds the first thickness T1. For example, a thickness ratio, T2/T1, can be 1.5:1 or greater, up to 2.5:1. The transition between thin and thick portions of the connecting ribs 66 is made by curved transitions 78 of large radii (e.g., the radii of the transitions 78 can be 0.3 percent to 0.5 percent of the fan's aerodynamic diameter D, which is the swept outer diameter of the blades). In particular, some of the transitions 78, radially inner transitions, can define one side of the slot 74 at an intersection of the radial and circumferential portions 74A, 74B. Other transitions 78, radially outer transitions, can define curved terminal portions 74D of the slot 74. The transitions 78 are formed by the path or profile defining the slots 74. The profiles of the unsupported connecting ribs and transition radii, viewed along the fan's rotation axis A, is defined by the profile of the slots 74, and is thus tangent to the same. As a result of this arrangement, the transition radius for the transitions 78 of the connecting ribs 66 can be controlled much more precisely as compared to the shapes resulting from CAD-generated fillets. This is because these radii are determined by the shape of the slots 74, which are, in turn, controlled by an explicit, 2-dimensional profile contained in the CAD model. Furthermore, the transitions 78 defining the large radii extend uniformly in the axial direction A, along the axial extent of the connecting rib 66. This distributes resulting stress concentrations over a larger volume of material. Because the radii of the transitions 78 are defined by the 2-dimensional profile of the adjacent slots 74, they can be made larger than 3-dimensional fillets created between adjacent surfaces by the CAD system. Larger radii are better at distributing stresses at connecting structures. As a result of the characteristics described above, maximum material stresses are reduced and can be predicted and controlled with more accuracy. In other areas, e.g., radially inward and radially outward of the transitions 78 between thin and thick portions of the connecting ribs 66, CAD-generated fillets 82 are acceptable as these are not critical stress riser positions.

Figure 4:
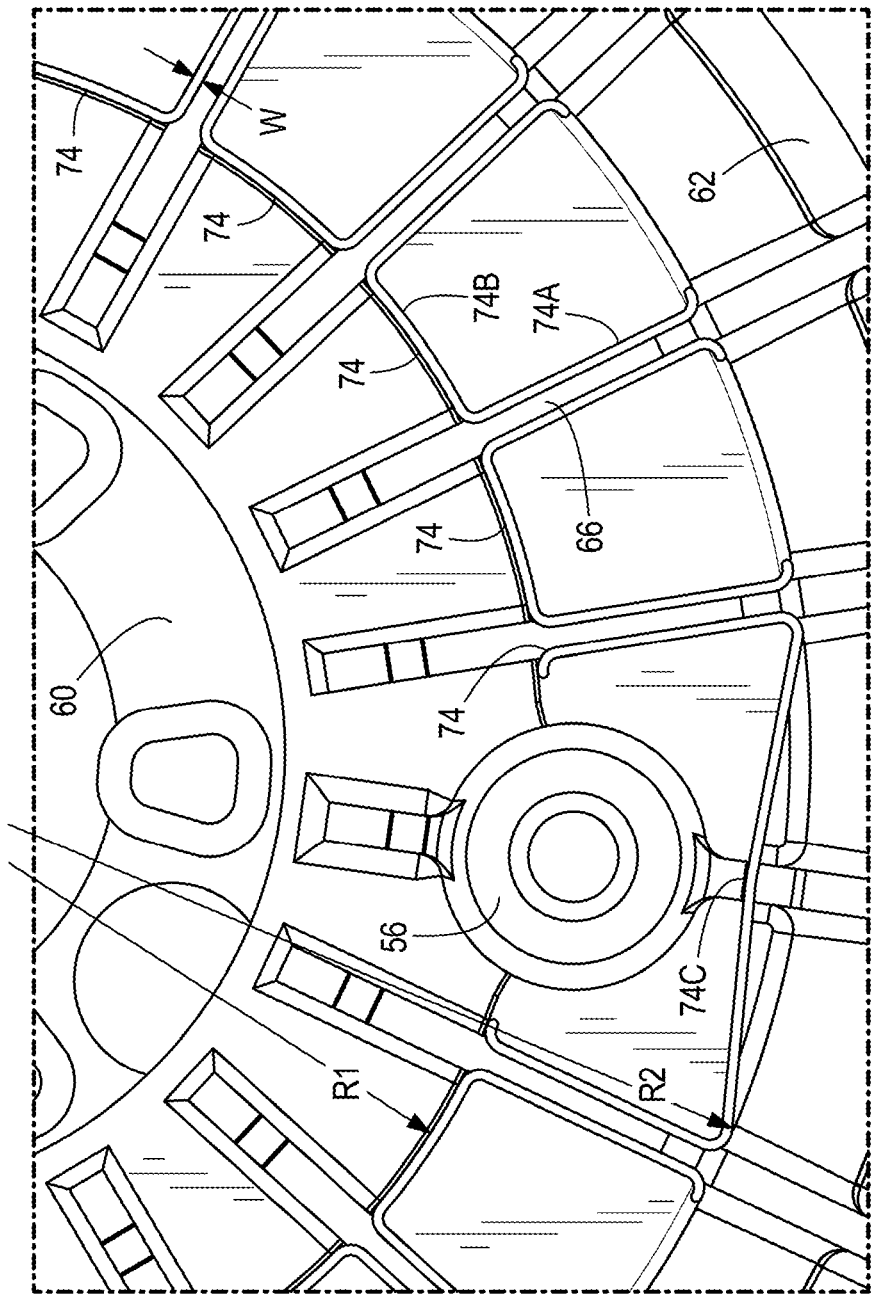
FIG. 4 is a detail view of a portion of the hub shown in FIG. 3.
Figure 5:
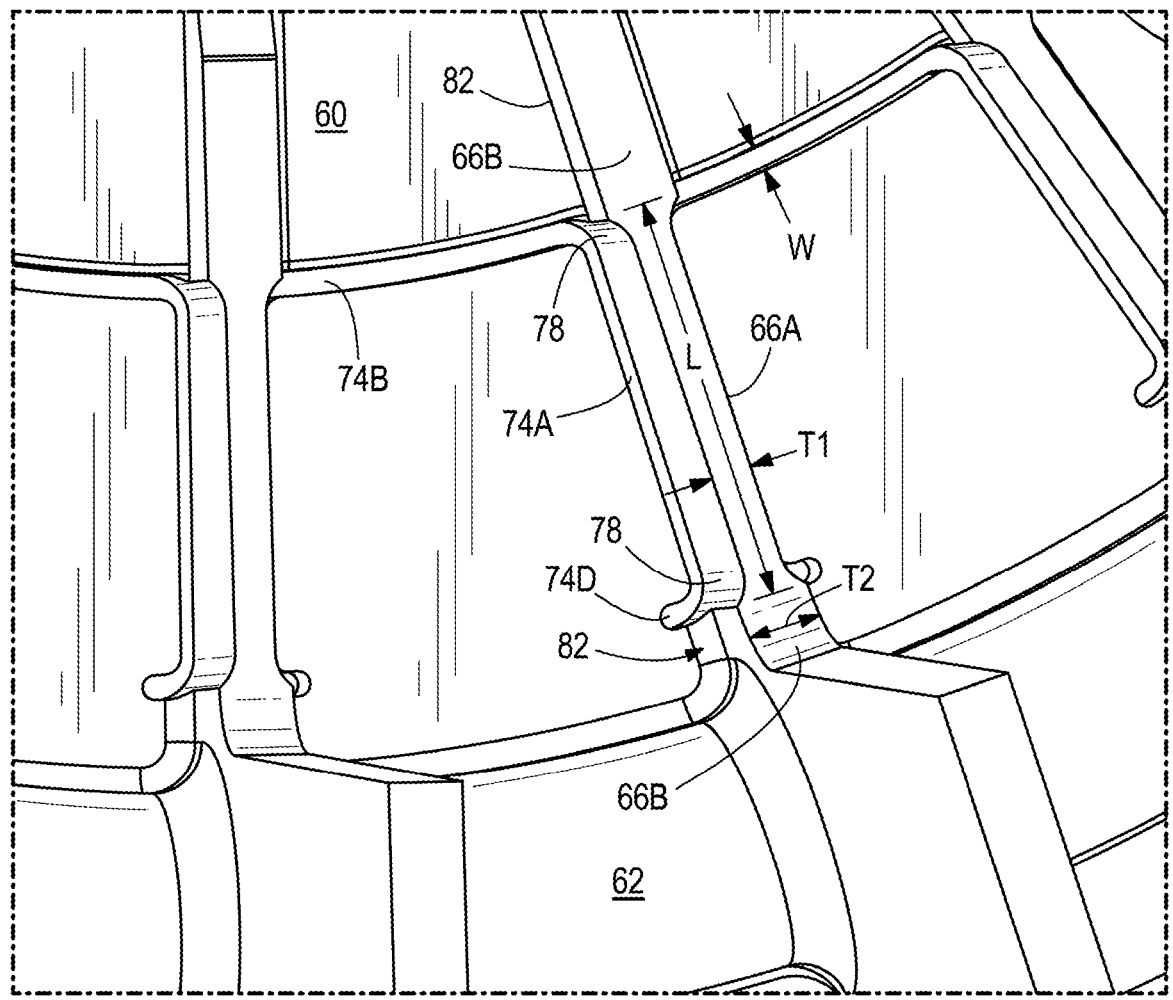
FIG. 5 is a detail perspective view of a portion of the hub shown in FIGS. 3 and 4.

In order to accommodate the mounting bosses 56 for the EC motor 24, the circumferential path of the slot(s) 74 at the circumferential location of the mounting boss 56 deviates in the immediate areas of the bosses 56 as shown in FIG. 4. In particular, at locations spaced from the bosses 56, the radial slots 74A bordering two adjacent ribs 66 are connected with the circumferential slots 74B at a first radial distance R1, or first radius, from the central axis A. The first radial distance R1 may intersect the mounting bosses 56. At the locations of the mounting bosses 56, two adjacent radial slots 74A are connected by a circumferential slot 74C that deviates from the first radius R1, and in some cases is exclusively outside the first radius R1. The circumferential slot 74C can be arcuate (e.g., strictly circumferential about the axis A) or may have other curved or straight shapes. As shown, the circumferential slot 74C is a straight slot connecting the radial outer ends of the two adjacent radial slots 74A at a second radial distance R2, or second radius, and the mounting bosses 56 are positioned inside the second radius R2. Thus, the circumferential slots 74C deviate around the mounting bosses 56 on the radial outer side. The otherwise normal distribution or pattern of unsupported ribs 66 is interrupted in these areas. As a result, the remaining unsupported ribs 66 are uniform in length, and have sufficient length to acoustically decouple the fan from the motor 24. Stresses from gyroscopic and vibrational forces are thus evenly divided among the remaining ribs 66.

Figure 6:
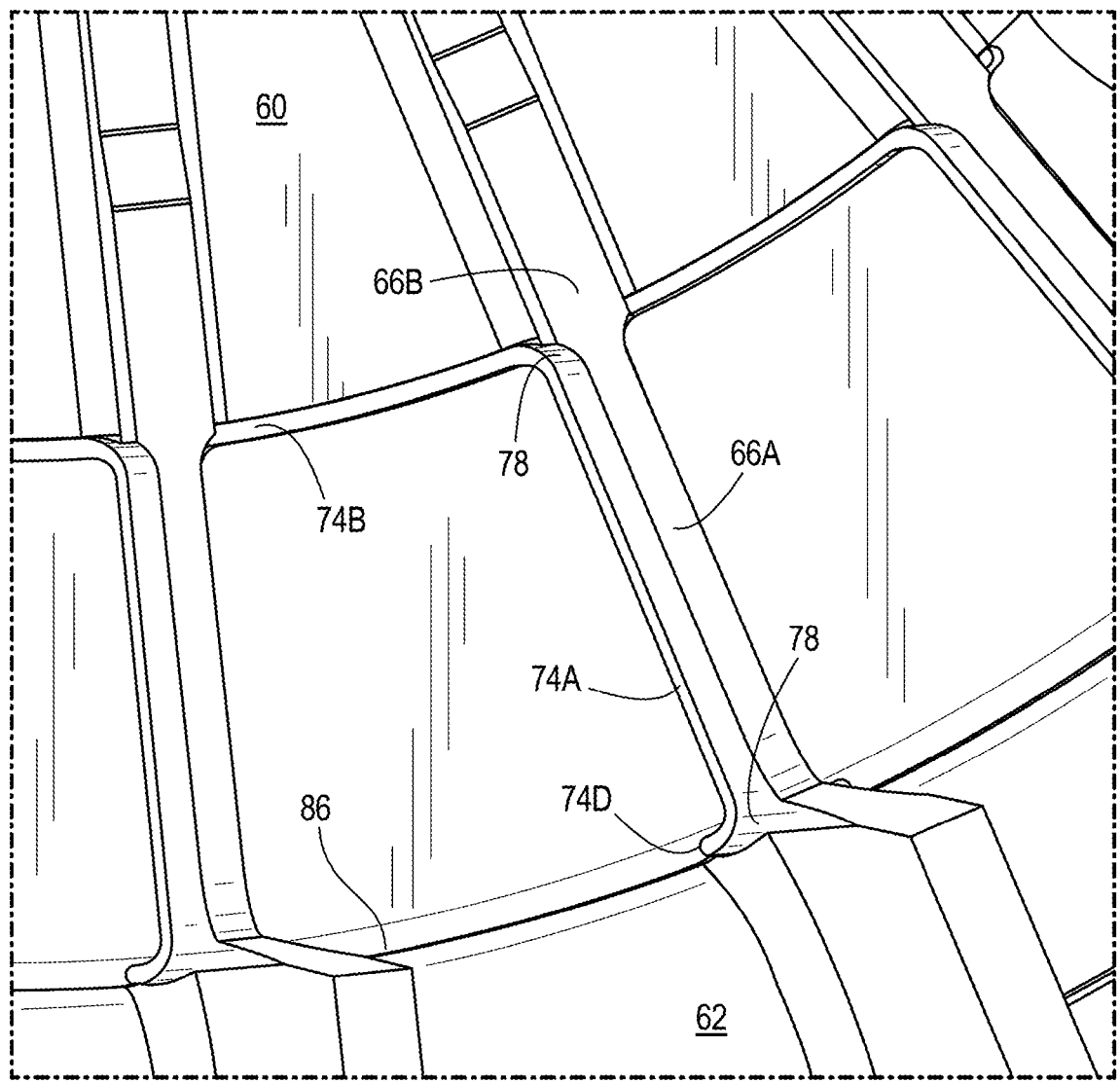
FIG. 6 is a detail perspective view of a portion of the hub of a second embodiment of the present disclosure.

FIG. 6 illustrates a modified embodiment of the hub 30 in which the unsupported (slotted) portion 66A of the connecting ribs 66 ends at a circumferential wall 86 of the hub interior. In other words, the unsupported portion 66A extends radially outwardly to the circumferential wall 86. In this case, the slots 74 and resulting transition radii 78 are tangential to the circumferential wall 86.

Figure 7:
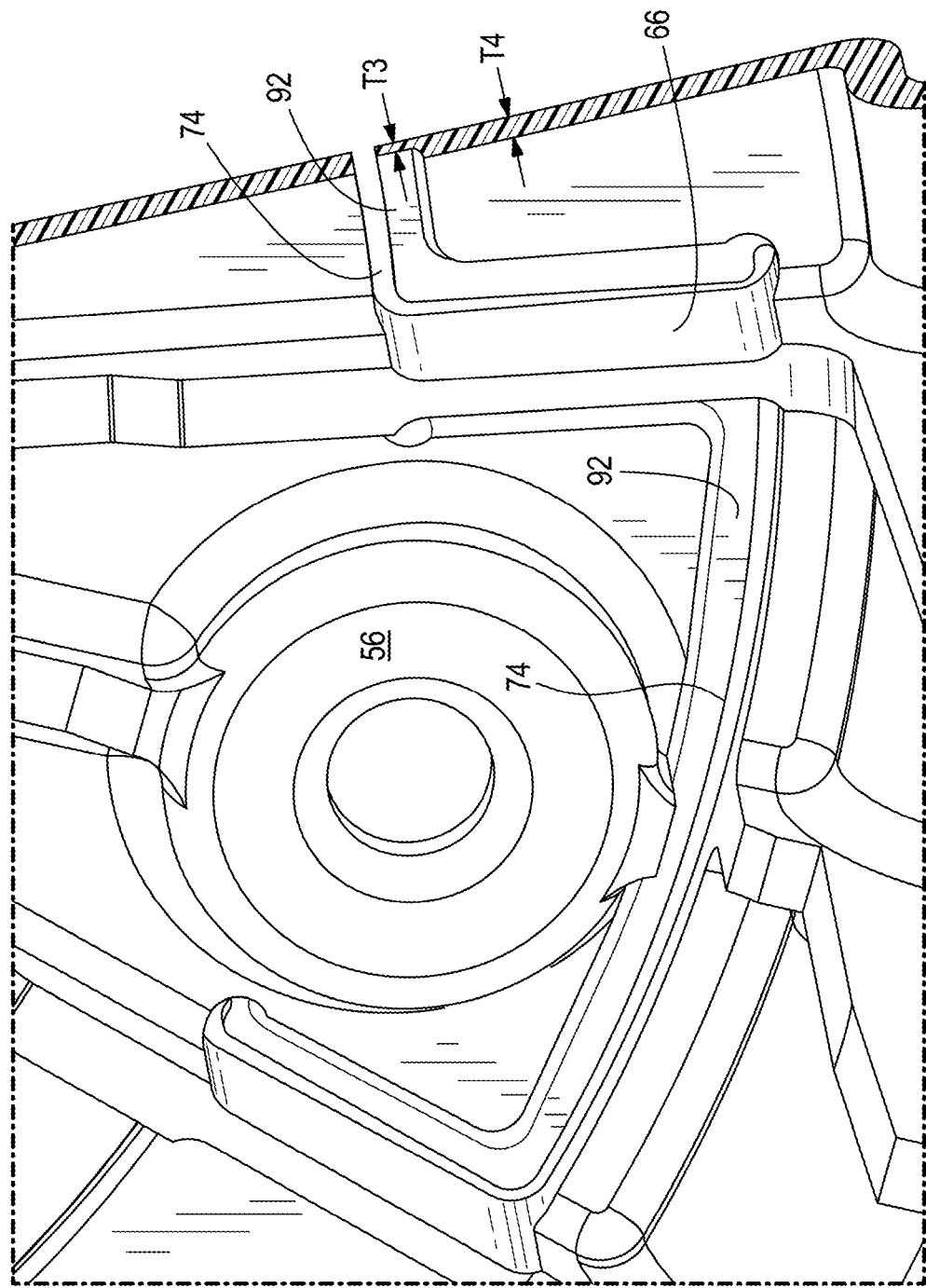
FIG. 7 is a cross-section view of a portion of the hub of a third embodiment of the present disclosure.

FIG. 7 illustrates another modified embodiment of the hub 30 in which a step 92 is added to the hub material immediately bordering the slot 74 on the concave motor-receiving side of the fan hub. This step 92 results in a reduced material thickness T3 of the planar hub face directly adjacent to the slot 74 as compared to the nominal hub thickness T4 surrounding the slot 74, away from the ribs 66. Both the thicknesses T3, T4 are measured parallel to the axis A. As a result, the corresponding regions of the injection molding tool used to produce the fan are larger and more robust where they form the slots 74, and this is accomplished without enlarging the slot width W. The thickness ratio T3/T4 can be between 0.1 and 0.6. The thickness reduction to T3 can be localized to the region within 1 mm to 4 mm of the slot 74 in some embodiments. The step 92 can be provided along the entire length of the slot 74 as shown, or over a majority thereof.

Designing the ribs 66 and their attachment portions 66B as disclosed herein results in improved control of stress concentrations that naturally occur due to the rigid structure at the attachment portions 66B as compared to the more flexible structure of the unsupported rib portions 66A extending radially along the slotted region. Gyroscopic and vibrational forces acting on the fan create stress concentrations at these intersections. Although conventional fillets can help manage the stress concentrations, such fillets leave complex end-shapes, and the exact shape of the fillets and their end-shapes, typically determined by CAD software and subject to change within the injection-molding process, can introduce uncertainty in the design of the fan as well as in predicting material stresses. Additionally, the hub design disclosed herein accommodates the choice of an electronically-commutated motor in which the fan hub does not affix to a drive shaft but rather is mounted to the rotor of the EC motor through screw bosses located near the outer perimeter of the rotor and substantially outboard of the axis A, but located on the inner hub portion with respect to the ribs 66 and the slots 74. The features disclosed herein, particularly the configuration of the slots 74 around the mounting bosses 56 provides adequate radial separation between the inner and outer hub portions 60, 62 for the unsupported rib portions 66A.

Various features of the invention are set forth in the following claims.

What is claimed is:

1. An axial fan assembly comprising:
   a plurality of blades rotatable about a central axis;
   a hub formed by a face portion that extends radially outwardly from the central axis and a cylindrical portion connecting the plurality of blades at radially-inner ends thereof;
   a motor situated at least partially within a concavity of the hub and connected to an inner portion of the hub within the face portion, wherein the inner portion is isolated from an outer portion of the hub including the cylindrical portion by a plurality of slots; and
   a plurality of ribs extending from the face portion axially toward the motor, each of the plurality of ribs having an unsupported region, the profile of which is defined by respective paths traversed by bordering ones of the plurality of slots,
   wherein inner and outer attachment portions of the plurality of ribs extend radially inward and radially outward, respectively, from the unsupported region of each of the plurality of ribs to attach with the inner and outer hub portions,
   wherein, when viewed along the central axis, a first thickness defined at the unsupported region of each of the plurality of ribs is less than a second thickness defined at one of the inner and outer attachment portions such that a ratio of the second thickness to the first thickness is 1.5:1 to 2.5:1,
   wherein, along each of the plurality of ribs, curved transitions with transition radii are defined by mutual divergence of the respective paths traversed by the bordering ones of the plurality of slots at the transition from the first thickness to the second thickness, the transition radii extending uniformly along a full axial extent of each of the plurality of ribs.

2. The axial fan assembly of claim 1, wherein the second thickness is present at both the inner and outer attachment portions.

3. The axial fan assembly of claim 1, wherein the transition radii are 0.3 percent to 0.5 percent of a swept outer diameter of the plurality of blades.

4. The axial fan assembly of claim 1, wherein each of the plurality of slots includes a circumferential portion and two radial portions extending from opposite ends of the circumferential portion.

5. The axial fan assembly of claim 4, wherein each of the curved transitions is formed at an intersection of the circumferential slot portion and one of the radial slot portions.

6. The axial fan assembly of claim 5, wherein additional curved transitions between the unsupported region of each of the plurality of ribs and the other of the inner and outer attachment portions are formed at respective curved terminal portions of the bordering ones of the plurality of slots.

7. The axial fan assembly of claim 6, wherein the curved terminal portions are tangential to a circumferential wall provided in the hub.

8. The axial fan assembly of claim 4, wherein the circumferential portion of each of the plurality of slots connects radially inner ends of the two radial slot portions.

9. The axial fan assembly of claim 1, wherein
the motor is connected to the first hub portion at a plurality of mounting bosses,
the plurality of slots define a circumferentially-repeating pattern in which radial slot portions adjacent two adjacent ones of the plurality of ribs are interconnected by a circumferential slot portion at a first radial distance from the central axis, and
wherein the circumferentially-repeating pattern is deviated at the locations of the plurality of mounting bosses, such that a circumferential slot portion interconnecting two radial slot portions along each one of the plurality of mounting bosses extends beyond the first radial distance to deviate around the mounting boss.

10. The axial fan assembly of claim 1, wherein an axially-measured material thickness of the hub within the face portion is locally reduced at a step directly bordering each of the plurality of slots.

11. An axial fan assembly comprising:
a plurality of blades rotatable about a central axis;
a hub connecting the plurality of blades at radially-inner ends thereof, the hub having a front face;
a motor positioned opposite the front face and connected to a first portion of the hub, wherein a second portion of the hub supporting the plurality of blades is isolated from the first portion of the hub by a plurality of slots; and
a plurality of ribs having opposite radial ends interconnecting the first and second hub portions, the plurality of ribs extending from the front face toward the motor,
wherein each of the plurality of ribs has an unsupported region, the profile of which is defined by respective paths traversed by bordering ones of the plurality of slots,
wherein, at each of the opposite radial ends of the unsupported region, there is an attachment portion and curved transitions between the unsupported region and the attachment portion, the curved transitions with transition radii being defined by mutual divergence of the respective paths traversed by the bordering ones of the plurality of slots, the transition radii extending uniformly through the hub from the front face to a rearward extent of the plurality of ribs.

12. The axial fan assembly of claim 11, wherein the curved transitions at one of the opposite radial ends are defined by intersections between respective radial and circumferential slot portions.

13. The axial fan assembly of claim 12, wherein the curved transitions at the other of the opposite radial ends are defined by respective curved terminal ends of the adjacent pair of slots.

14. The axial fan assembly of claim 13, wherein the curved terminal ends are tangential to a circumferential wall provided in the hub.

15. The axial fan assembly of claim 11, wherein when viewed along the central axis, a thickness defined at the unsupported region of each of the plurality of ribs is less than a thickness defined at the corresponding inner attachment portion and less than a thickness defined at the corresponding outer attachment portion.

16. The axial fan assembly of claim 11, wherein the transition radii are 0.3 percent to 0.5 percent of a swept outer diameter of the plurality of blades.

17. The axial fan assembly of claim 11, wherein each of the plurality of slots includes a circumferential portion and two radial portions extending from opposite ends of the circumferential portion, and wherein the circumferential portion of each of the plurality of slots connects radially inner ends of the two radial slot portions.

18. The axial fan assembly of claim 11, wherein
the motor is connected to the first hub portion at a plurality of mounting bosses,
the plurality of slots define a circumferentially-repeating pattern in which radial slot portions are interconnected by a circumferential slot portion at a first radial distance from the central axis, and
wherein the circumferentially-repeating pattern is deviated at the locations of the plurality of mounting bosses, such that a circumferential slot portion interconnecting two radial slot portions along each one of the plurality of mounting bosses extends beyond the first radial distance to deviate around the mounting boss.

19. The axial fan assembly of claim 11, wherein an axially-measured material thickness of the hub is locally reduced at a step directly bordering each of the plurality of slots.

20. An axial fan assembly comprising:
a plurality of blades rotatable about a central axis;
a hub connecting the plurality of blades at radially-inner ends thereof;
a motor connected to a first portion of the hub at a plurality of mounting bosses, wherein a second portion of the hub supporting the plurality of blades is isolated from the first portion of the hub by a plurality of slots; and
a plurality of ribs interconnecting the first and second hub portions, the plurality of ribs defining unsupported regions along bordering ones of the plurality of slots,
wherein the plurality of slots define a circumferentially-repeating pattern in which radial slot portions adjacent two adjacent ones of the plurality of ribs are interconnected by a circumferential slot portion at a first radial distance from the central axis, and
wherein the circumferentially-repeating pattern is deviated at the locations of the plurality of mounting bosses, such that a circumferential slot portion interconnecting two adjacent radial slot portions along each one of the plurality of mounting bosses extends beyond the first radial distance to deviate around the mounting boss.

\* \* \* \* \*